3,143,564
METHOD FOR PRODUCING 2-TRANS-VITAMIN A ACID
Masanao Matsui, Tokyo, Shigeya Saijo, Nishinomiya-shi, Kiyoshi Ohizumi, Ashiya-shi, and Teruya Nishida and Shigeru Okano, Toyonaka-shi, Japan, assignors to Sumitomo Chemical Company, Ltd., Osaka, Japan, a corporation of Japan
No Drawing. Filed Jan. 15, 1962, Ser. No. 166,389
4 Claims. (Cl. 260—468)

The invention relates to the method for producing trans-vitamin A acid compounds by isomerization of 2-cis-vitamin A acid, its lower alkyl ester or amides. More particularly, it relates to the method for producing 2-trans-vitamin A acid compounds of the following formula

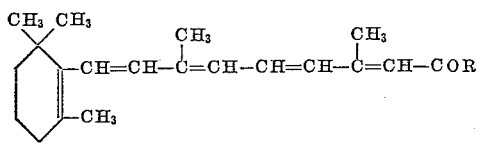

wherein R is selected from the group consisting of hydroxy, lower alkoxy, and amino radicals, by treating a member of the group consisting of 2-cis-vitamin A acid, its lower alkyl ester and amides, with at least one member of the group consisting of potassium amide and potassium alcoholate in an inert medium, thereby to be isomerized to yield the corresponding 2-trans-vitamin A acid compound.

Vitamin A comprises a number of stereo-isomers, due to the double bonds, and the most effective one from the biological point of view is the all-trans-vitamin A. The isomer having 2-cis (and otherwise trans) configuration is called neovitamin A, and its biological potency is said to be only 75% of that of the all-trans isomer.

Vitamin A acid is an important intermediate in the synthesis of vitamin A. Heretofore, various methods have been known for its synthesis, but vitamin A acid produced by any of these methods is partially or wholly 2-cis isomer. When 2-cis-vitamin A acid is converted to vitamin A by any of the conventional methods, it is quite natural that the vitamin A produced has the 2-cis configuration (namely neovitamin A).

Thus, the effective isomerization of 2-cis-vitamin A acid to 2-trans-vitamin A acid would lead to an advantageous synthesis of vitamin A having higher biological activity.

A method of isomerization of 2-cis-vitamin A acid to all-trans-vitamin A acid was proposed in the past by C. D. Robeson et al. (see the Journal of the American Chemical Society, 77, 4118 (1955)), wherein 2-cis-vitamin A acid is dissolved in a mixture of benzene and ether in which a very small amount of iodine is added beforehand, and the solution is exposed to the light. In this method, however, the polymerization or decomposition of the vitamin A acid takes place concurrently during the isomerization reaction, so that the yield of trans-vitamin A acid is not as satisfactory, and furthermore has the disadvantage of being difficult to reproduce.

Thus, an object of this invention is to provide a novel method for the isomerization of 2-cis-vitamin A acid, its ester or amides to 2-trans-vitamin A acid compounds in excellent yield and without accompanying formation of unfavorable by-products. Other objects and advantages of the present invention will be apparent from the following description.

To accomplish these objects, the inventors provide a method for producing 2-trans-vitamin A acid compounds, which comprises contacting a member of the group consisting of 2-cis-vitamin A acid, its alkyl esters and amides with at least one member of the group consisting of potassium amide and potassium alcoholate, in an inert medium.

According to the present invention, the 2-cis-vitamin A acid, its alkyl ester or amides may have any steric configuration at the double bonds other than that in 2-position, but the ones having 2-cis- and otherwise trans configuration are the most advantageous, since they can produce all-trans-vitamin A acid and its derivative. In case of using the alkyl ester as the material and potassium amide as the isomerization catalyst, the isomerized product may be converted at least partly to the acid amide form. In case of using the alkyl ester and a potassium alcoholate, however, the isomerized product remains in the ester form. The 2-trans-vitamin A acid compound in the present invention is in the form of acid, a lower alkyl ester, or acid amide, just after the isomerization. However, the compound, other than the acid, is advantageously hydrolyzed before the separation for the purpose of the purification. The alkyl radical forming the acid ester may be any of lower alkyl radicals, and, among those, methyl and ethyl are the most preferable.

The isomerization catalyst to be contacted with the 2-cis-vitamin A acid, its ester or amide is at least one member of the group of potassium amide and potassium alcholate, the examples of the latter being potassium methylate, potassium ethylate, potassium propylate (including normal and iso), potassium butylate (including normal, iso, and secondary), and other higher alcoholates of potassium.

The mechanism of the isomerization by use of these compounds is not yet known, but the isomerization does not occur if the corresponding sodium or lithium compounds are employed.

The present invention is effected in the presence of an inert medium. As for the medium, hydrocarbon solvents and lower alkyl ethers are preferable. In case of using a potassium alcoholate as the isomerization catalyst, an aliphatic lower alcohol may be used as the solvent. If the alcohol is used as the solvent in case of using potassium amide, the latter is readily converted to potassium alcoholate, and plays its role.

The isomerization reaction of the present invention may be carried out at or near ordinary room temperature, but a lower and higher temperature, such as from about 0° C. to about 80° C., can be employed, if desired.

The amount of the potassium amide or the potassium alcoholate may be varied within a broad range. Ordinarily, at least 1 mol, more preferably 1 to 3 mols, of such compound per mol of 2-cis-vitamin A acid, its ester or amide is used. In general, a mixture of the isomerization catalyst and the acid, its ester or amide, in an inert medium, is stirred for 0.5 to 20 hours, preferably for 3 to 7 hours. After that time, the resulting 2-trans-vitamin A acid compound can be separated, preferably after hydrolysis, from the reaction mixture according to the known process.

Now, the invented method is illustrated in reference to the following examples, which are merely by way of illustration and not by way of limitation.

*Example 1*

To 2.1 g. of finely dispersed potassium amide in 20 cc. of toluene, 12 g. of 2-cis-vitamin A acid methyl ester ($\epsilon$(360 m$\mu$) 39300) dissolved in 20 cc. of toluene was added dropwise at 0° C., and the mixture is stirred for 4 hours at the room temperature. Thereafter, the mixture is treated with 30 cc. of methanol under cooling, further treated with 10 cc. of 50% potassium hydroxide solution, heated at 50° C. for 1 hour, diluted with water, and then neutralized with dilute sulfuric acid, to isolate yellow needles in the mixture. After filtration, washing with water and then with methanol, and drying in vacuo, 6.3 g. of the crystalline all-trans-vitamin A acid, M.P. 179.5–181° C., ϵ(350 mμ) 44900, is obtained.

The filtrate is separated into two layers, and the toluene layer is, after being washed with water, evaporated in vacuo. The residue is treated with a small amount of petroleum benzine, and cooled. The crystals which deposit are collected, washed with petroleum benzine, and dried in vacuo. The crude all-trans-vitamin A acid, 3.3 g., is recrystallized from ethyl alcohol, M.P. 179–180° C., ϵ(350 mμ) 44800.

*Example 2*

To 2 g. of finely dispersed potassium amide in 80 cc. of ethyl ether, 5.5 g. of 2-cis-vitamin A acid (ϵ(353 mμ) 39700) is added under cooling, and stirring is continued for 3 hours at the ordinary temperature. The mixture is treated with 20 cc. of methanol with cooling, diluted with water, neutralized with a dilute sulfuric acid, and separated into two layers.

The ether layer is washed with water, and evaporated in vacuo. By addition of a small amount of petroleum benzine to the residue, cooling, filtration, washing with petroleum benzine, and drying in vacuo, 3.9 g. of crude all-trans-vitamin A acid is obtained. Recrystallization with ethyl alcohol shows M.P. 178–180° C., ϵ(350 mμ) 44900.

*Example 3*

To a potassium ethylate solution prepared from 2 g. of potassium and 80 cc. of absolute ethyl alcohol, a solution of 9.5 g. 2-cis-vitamin A acid methyl ester (ϵ(360 mμ) 39300) in 10 cc. of absolute ethyl alcohol is added, and the mixture is refluxed for 1 hour. Then, the ethyl alcohol is distilled off in vacuo, and the residue is mixed with benzene, cooled, treated with water, and separated into two layers.

The benzene layer is washed with water, and evaporated in vacuo to leave 9.1 g. of oily all-trans-vitamin A acid methyl ester. Upon addition of a small amount of methanol and cooling, crystals are isolated, filtered and recrystallized from methanol, M.P. 72–73 C., ϵ(357 mμ) 45000.

We claim:
1. A method for producing 2-trans-vitamin A acid compounds, comprising contacting one member of the group consisting of 2-cis-vitamin A acid, its lower alkyl esters and unsubstituted amides, with potassium amide in an amount of at least 1 mol per mol of the 2-cis-vitamin A acid compound to be isomerized in an inert medium for 0.5 to 20 hours, thereby to be isomerized to yield the corresponding 2-trans-vitamin A acid compound.
2. A method according to the claim 1, wherein said inert medium is selected from the group consisting of hydrocarbon solvents, lower dialkyl ethers, and aliphatic lower alcohols.
3. A method according to the claim 1, wherein 2-cis-vitamin A acid methyl ester is contacted with potassium amide.
4. A method according to the claim 1, wherein 2-cis-vitamin A acid is contacted with potassium amide.

References Cited in the file of this patent

UNITED STATES PATENTS

| | | |
|---|---|---|
| 2,576,104 | Shantz et al. | Nov. 27, 1951 |
| 2,680,755 | Robeson et al. | June 8, 1954 |

OTHER REFERENCES

Franklin: Nitrogen System of Compounds (New York, 1935), pages 53–4.

Karrer et al.: Carotenoids (New York, 1950), pages 38–40.

Robeson et al.: J. Am. Chem. Soc., volume 77, 4111–19 (1955).

Houben-Weyl: Methoden der organischen Chemie, vierte Auflage, Band IV, Teil 2, (Stuttgart, 1955), pages 44–5.

Noller: Chemistry of Organic Compounds (Philadelphia, 1957), 354–357.